June 7, 1966 W. N. ROOS 3,254,872
ECCENTRIC PLUG VALVE HAVING A LIMIT STOP
AND METHOD OF MANUFACTURE THEREOF
Original Filed Oct. 13, 1960 2 Sheets-Sheet 1
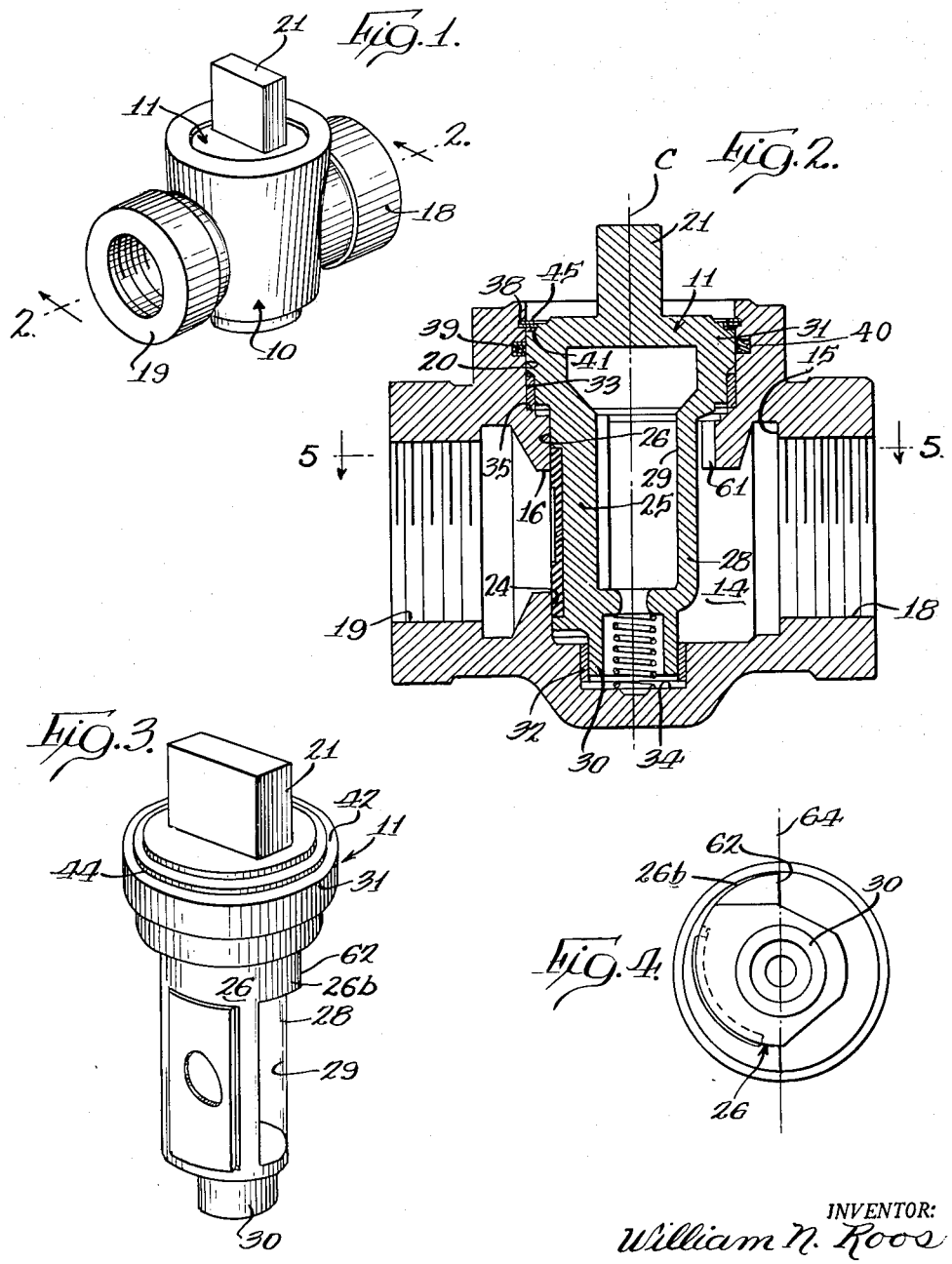
INVENTOR:
William N. Roos
BY
Wolfe, Hubbard, Voit & Osann

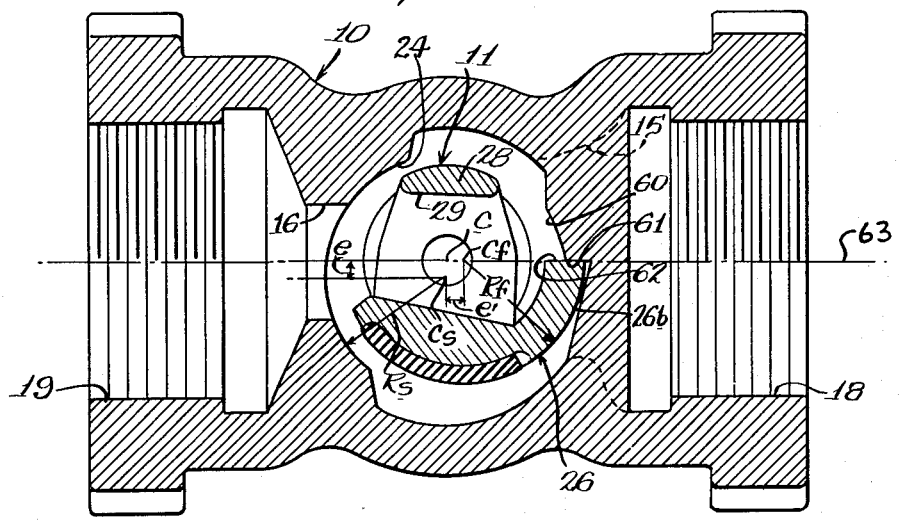

United States Patent Office 3,254,872
Patented June 7, 1966

3,254,872
ECCENTRIC PLUG VALVE HAVING A LIMIT STOP
AND METHOD OF MANUFACTURE THEREOF
William N. Roos, St. Cloud, Minn., assignor to Dezurik
Corporation, Sartell, Minn., a corporation of Minnesota
Original application Oct. 13, 1960, Ser. No. 62,474, now
Patent No. 3,170,669, dated Feb. 23, 1965. Divided
and this application June 19, 1964, Ser. No. 376,526
5 Claims. (Cl. 251—163)

This is a division of application Serial No. 62,474, filed October 13, 1960, now Patent Number 3,170,669 granted February 23, 1965.

The present invention relates in general to valves for controlling the flow of fluids, both liquids and gases, in pipes or conduits and, more particularly, to the formation and construction of an improved eccentric plug valve having an eccentric plug rotatable between two angular positions in a valve body to open or close a flow passage therethrough. In its principal aspects, the invention is concerned with an improved eccentric plug and valve body construction, and to methods of manufacture thereof.

It is a general aim of the present invention to provide an improved eccentric plug valve and a method of manufacture thereof, which valve is rugged, compact and which permits of economical construction, and yet which will remain reliable and easy to operate over many years in service and many open-close cycles of operation.

A further object of the invention is the provision of an improved eccentric plug valve and method of manufacture thereof which permits the open position of the plug to be defined and controlled precisely without the need for assembled stop pins, screws or the like. In this connection, it is a related object of the invention to provide an improved method for manufacturing eccentric plug valves employing cast plugs and valve bodies and wherein a pair of cooperable stop surfaces are formed on the center or parting planes of the respective plug and valve body castings so as to be accurately located on the castings without requiring separate machining operations.

Other objects and advantages of the invention will become apparent as the following description proceeds, taken in conjunction with the accompanying drawings, in which:

FIGURE 1 is a perspective view of an eccentric plug valve embodying the features of the present invention;

FIG. 2 is a vertical cross-sectional view on an enlarged scale taken substantially along the line 2—2 in FIG. 1, here depicting the plug in its closed position;

FIGS. 3 and 4 are perspective and bottom views, respectively, of the eccentric plug shown in FIG. 2; and, FIG. 5 is a horizontal sectional view taken substantially along the line 5—5 of FIG. 2, but here showing the plug in its fully opened position.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

Referring more particularly to the drawings, there is illustrated in FIGS. 1 and 2 an exemplary eccentric plug valve made in accordance with the present invention and employing as its major components a valve body 10 and a plug 11 disposed therein. As best illustrated in FIG. 2, the exemplary valve body 10 is hollow and its interior walls define a flow passage 14 extending between inlet and outlet openings 15, 16 respectively which are adapted for connection to pipes or conduits (not shown) by suitable means such as internally threaded collars 18, 19. Opening substantially normally or at right angles to the flow passage 14 is an entrance into the valve body 10 which is defined by a circular wall 20, and into which the plug 11 is inserted.

In general, the plug 11 extends across the flow passage 14, and is journaled for rotation through approximately ninety degrees between two angular positions; i.e., the opened position shown in FIG. 5 and the closed position shown in FIG. 2. A flat-surfaced lug 21 extends upwardly from the top of the plug 11 to receive a wrench or the like by which an operator may rotate the plug between its two limit positions. Referring for the moment to FIGS. 2 and 5, the center or axis of the circular entrance 20 is located at C, and the plug 11 is journaled for rotation about this axis. The valve body 10 is, however, cast and machined with an interior arcuate seat surface 24 which has a radius of curvature $R_s$ and a center or axis of curvature $C_s$, the latter being parallel to but eccentrically displaced by a distance $e$ from the axis of rotation C. The seat surface 24 borders and surrounds the outlet opening 16, and sealing contact with this surface will, therefore, close the flow passage 14 through the valve body. Closing or opening of the valve is effected by an eccentric portion 25 of the plug 11, this portion having a thickness considerably less than the width of the flow passage 14. As best shown in FIG. 5, the eccentric portion 25 is machined to have an arcuate surface or face 26 which has a radius of curvature $R_f$ and a center or axis of curvature $C_f$. The center or axis of curvature $C_f$ is parallel to but displaced eccentrically by a distance $e'$ from the axis of rotation C. In the exemplary construction here shown, the two radii of curvature $R_s$ and $R_f$ for the arcuate seat 24 and the arcuate face 26 are substantially equal. Moreover, the displacement or eccentricity $e$ of the center $C_s$ from the axis of rotation C is substantially equal to the eccentricity $e'$ of the center $C_f$, so that the two centers $C_s$, $C_f$ become superimposed when the plug 11 is in the fully closed position shown in FIG. 2.

The eccentric portion 25 of the plug 11 is strengthened by a spaced, parallel brace 28 which extends from the top to the bottom portions of the plug and leaves a large central opening 29 which becomes alined with the flow passage 14 when the plug is in its opened position (FIG. 5). On the other hand, as the plug is rotated clockwise from the position shown in FIG. 5 to that illustrated in FIG. 2, the face 26 is moved progressively into firm sealing contact with the seat 24, so that eccentric portion 25 completely closes off the opening 16 and prevents the flow of fluid through the valve body. The eccentricity of the arcuate seat 24 and the plug face 26 relative to the axis of rotation C results in gradual mating of these surfaces and progressive closure of the valve.

It will be observed from FIGS. 2 and 3 that the plug 11 is machined to have a hollow, cylindrical tail portion 30 at its lower end and a cylindrical head portion 31 at its upper end. The outer cylindrical surfaces of the head and tail portions are disposed concentrically about the axis of rotation C, and they are journaled in bushings or bearings 32 and 33 when the plug is inserted in the body 10, as shown. These bearings are preferably of the porous type, for example, sintered bronze, impregnated with a lubricant so as to be self-lubricating over their entire life. The lower bearing 32 is press-fitted into a cylindrical pocket or recess 34 formed in the body, while the upper bearing 31 is press-fitted into the circular entrance 20 against a radial shoulder 35 formed at the bottom of that entrance.

As here shown particularly in FIG. 2, the valve body 11 is formed with first and second annular grooves 38 and 39 cut into the wall 20 which defines the circular entrance. Disposed in the groove 39, which is immediately above the bearing ring 33, is a sealing ring 40 made of a resilient, deformable material such as synthetic rubber or the like. The sealing ring 40 is somewhat larger in cross-section than the groove 39, so that it is not only held captive but is also deformed into fluid-tight sealing contact with the adjacent cylindrical surface of the head portion 31. Preferably the sealing ring is of the configuration familiarly known as a "quad-ring." It therefore bears with good sealing contact against both the surface of the head portion 31 and the sides of the groove 39.

As thus far described, the plug 11 is journaled for rotation in the valve body 10, and fluid is sealed against escape through the entrance 20. In order both to retain the plug in the valve body and to create an automatically variable frictional resistance against slamming, a braking ring 41 of friction material is disposed to overlie and engage a portion of the end surface of the plug. As here shown, the head portion 31 of the plug 11 is stepped to define a radial end surface 42 and an axial shoulder 44, the braking ring 41 resting upon the radial surface and being prevented from shifting by the shoulder 44. To bear against the upper surface of the braking ring 41, an annular retainer ring 45 is held captive in the groove 38 with its inner portion overlying the ring 41.

As noted above, the braking ring 41 here serves to prevent or impede slamming of the plug from one to the other of its opened and closed positions. However, the particular manner in which the braking ring operates to achieve its intended function does not form any part of the present invention. Those interested in ascertaining the specific details relating to this particular feature of the exemplary eccentric plug valve are referred to the copending application of William N. Roos, Serial Number 62,474, filed October 13, 1960, now Patent Number 3,170,669, and assigned to the assignee of the present application.

As previously noted, rotation of the plug 11 in a clockwise direction (as viewed in FIG. 5) is limited by direct contact between the metal seat 24 and the metal face 26 of the plug. It is also desirable to limit rotation of the plug in a counter-clockwise direction so that it cannot be rotated beyond its fully opened position as shown in FIG. 5. In order to achieve this desirable objective, it is necessary to provide an open position stop which serves (1) to apprise an operator by abrupt resistance to turning that the valve has been fully opened, and (2) to prevent rotation of the plug in a counter-clockwise direction to such an extent that the arcuate face 26 thereon might be damaged by contact with the interior of the valve body 10 at a location other than the machined seat 24. It has been a common practice in prior valves to provide an open position stop for limiting rotation of the plug, such stop usually being formed by a separate pin or screw assembled on the valve body 10 to have limiting engagement with an externally projecting portion of the plug 11. Another approach heretofore used in the prior art has involved the formation of an inwardly projecting lug on the interior portion of the valve body and positioned to engage a machined surface on the valve plug. However, this latter approach has heretofore required relatively extensive and time consuming machining operations. Such operations not only are expensive, but moreover, normally require the use of special equipment to insure that the valve seat 24 is not damaged.

In accordance with one of the important aspects of the present invention, provision is made for forming the valve body and plug castings 10 and 11 in such a manner that cooperable internal stop surfaces are formed integrally therewith as an incident to the casting operation, thus minimizing the manufacturing cost for eccentric valves while simultaneously providing precisely located stop surfaces which serve to limit angular rotational movement of the valve plug 11 during opening of the valve so that further movement of the plug beyond the fully opened position (shown in FIG. 5) is effectively precluded. In attaining this objective, advantage is taken of the fact that eccentric plug valves of the exemplary type shown in the drawings are generally formed as a casting including an internal measuring spud 60. The spud 60 is provided with an arcuate surface constituting a continuation of the seat surface 24—that is, the arcuate surface of the measuring spud 60 and the seat surface 24 form segments of a circle having a radius of curvature $Rs$ and a center or axis of curvature $Cs$. The arcuate spud surface 60 is machined at the same time that the seat surface 24 is machined. The purpose of the measuring spud, which is located substantially diametrically opposite a portion of the seat surface 24, is to make possible precise measurement of the diameter of the seat surface 24 as the latter is being machined in the body casting.

In keeping with this aspect of the present invention and, inasmuch as the measuring spud 60 must necessarily be provided to afford accurate measurement of the valve seat during the machining of the body casting, the spud 60 is advantageously located so that one edge thereof falls on a center plane of the body casting 10 and, indeed, on the parting line 63 (FIG. 5) of the body casting. Thus, as shown in FIG. 9, the arcuate measuring spud 60 is terminated at one edge in a side surface 61 which is disposed in a plane 63 passing through and radial to the axis of rotation C. Since the surface 61 is on the parting line 63 of the body casting 10, it is accurately located, and need not be precisely formed through a finish machining operation.

To cooperate with the radial stop surface 61 on the interior of the valve body 10, the plug 11 is formed with a second stop surface 62. As best shown in FIGS. 3, 4 and 5, the eccentric arcuate face 26 which is formed on the plug 11 includes an extension 26b which is disposed partially above the passage 29 and which is terminated by an edge surface 62 lying in a plane passing through the axis of rotation C and radial to the arcuate face 26 of the plug. The plug 11 is a casting, preferably of bronze, the cylindrical and arcuate surfaces thereon being finished by conventional machining operations on a lathe or the like. However, in the formation of the plug in accordance with the present invention, the stop surface 62 is conveniently and advantageously located, as described above, so that it lies along a center plane 64 (FIG. 4) of the plug casting. Thus, when the plug is cast, the surface 62 is precisely located and need not be machined in a finishing operation.

As shown best in FIG. 5, when the plug 11 is rotated counterclockwise to a fully opened position at which the eccentric portion offers minimum resistance to flow through the valve body, then the stop surface 62 engages the stop surface 61, the latter being located at the edge of the measuring spud 60. It will be apparent that the overlapping or width of engagement of these two stop surfaces is equal to the eccentricity $e'$. In this manner, rotation of the plug 11 beyond its fully opened position is precisely and reliably stopped or prevented, yet neither separately assembled stop pins or external projections are required. No separate machining of the stop surfaces is necessary inasmuch as they are formed on the central or parting planes of the body and plug castings. This open position stop construction is thus one which adds no cost to the valve and which does not increase the external size or dimensions of the valve.

It will be understood from the foregoing that the present valve brings to this art significant improvements which not only result in a more compact and less expensive eccentric plug valve, but which also provides both open and closed positive stops for the plug which are conveniently and economically located without requiring separate machining or assembly operations. Since such separate machining and assembly operations, which have heretofore been required in valves employing cooperable stop surfaces, are eliminated when making valves in accordance with the present invention, such valves can be manufactured in substantially less time and without the need for special equipment.

I claim as my invention:

1. In an eccentric type plug valve, the combination comprising, a hollow body having inlet and outlet openings and a flow passage therebetween, a plug extending across said passage and journalled in said body for rotation about an axis, said body being a machined casting substantially symmetrical about a parting plane and having an inner, arcuate seat surface surrounding one of said openings and eccentrically disposed relative to said axis, said plug being a machined casting having an eccentric portion with an arcuate face eccentrically disposed relative to said axis, said face and said seat surface having sealing contact when said plug is rotated to bring them into mutual engagement, said body having an interior, integral, cast, arcuate measuring spud surface, said spud surface terminating at one edge in a first side surface lying in said parting plane, said face terminating at one edge in a second side surface radial thereto and lying on a central plane of said plug casting, said first and second side surfaces being mutually engaged to limit rotation of said plug when said eccentric portion has been retracted from said seat to a point where it presents minimum resistance to flow through said passage.

2. In an eccentric plug type valve, the combination comprising, a hollow body having inlet and outlet openings with a flow passage therebetween, walls defining a circular entrance opening into said flow passage and having a first axis disposed generally at right angles to such passage, said body being a machined casting substantially symmetrical about a parting plane and having an interior arcuate seat surface surrounding one of said openings, said seat surface having a first radius about a second axis which is parallel to and displaced a given distance from said first axis, said body also including an interior, integral, cast measuring spud having an arcuate measuring surface diametrically opposed to a portion of said seat portion, said spud having a first stop surface disposed in said parting plane, a plug disposed in said body for rotation about said first axis, said plug being a machined casting having an eccentric portion extending across said flow passage, said eccentric portion having an arcuate face defined about a third axis which is parallel to and displaced a given distance from said first axis, said eccentric portion having a second stop surface disposed in a central plane of said plug casting passing through said third axis and radially of said arcuate face, said second stop surface being located to engage said first stop surface and limit rotation of said plug in one direction.

3. In an eccentric plug type valve, the combination comprising, a hollow body having inlet and outlet openings with a flow passage therebetween, walls defining a circular entrance opening into said flow passage and having a first axis disposed generally at right angles to such passage, said body being a machined casting substantially symmetrical about a parting plane and having an interior arcuate seat surface surrounding one of said openings, said seat surface having a first radius about a second axis which is parallel to and displaced a given distance from said first axis, said body also including an interior, integral, cast, measuring spud having an arcuate measuring surface having a radius equal to said first radius and formed about said second axis, said measuring surface being substantially diametrically opposed to a portion of said seat portion, said spud having a first stop surface disposed in said parting plane, a plug disposed in said body for rotation about said first axis, said plug being a machined casting having an eccentric portion extending across said flow passage, said eccentric portion having an arcuate face defined about a third axis which is parallel to and displaced said given distance from said first axis, said eccentric portion having a second stop surface disposed in a central plane of said plug casting passing through said third axis and radially of said arcuate face, said second stop surface being located to engage said first stop surface and limit rotation of said plug in one direction.

4. The method of forming an eccentric type plug valve comprising the steps of forming a hollow metal body casting having a flow path extending therethrough and an entrance extending transversely of the path, forming a measuring spud on an internal wall of the body casting with the spud having an arcuate surface terminating in a first stop surface positioned on the parting line of the casting, forming a generally cylindrical metallic plug casting having a flow path extending therethrough, forming a second stop surface on a center plane of the plug casting, machining the arcuate surface of the spud and an internal surface of the body casting on a wall generally opposite the spud and surrounding the flow path to form a valve seat, machining an arcuate surface of the plug, and inserting the plug casting into the interior of the body casting through the entrance thereof so that when the plug casting is rotated to register the flow path therein with the flow path in the body casting, the cast first and second stop surfaces on the plug and body castings mutually engage one another.

5. The method of forming an eccentric type plug valve comprising the steps of forming a hollow metal body casting substantially symmetrical about a parting plane of the casting and having a flow path extending therethrough with an entrance transversely of the path, forming bearing surfaces in said casting about a first axis lying in the parting plane and coaxial with the entrance, forming a measuring spud on an internal wall of the body casting with the spud having a first stop surface lying in the parting plane of the casting, simultaneously machining an internal surface of the body casting and an internal surface of the measuring spud to form an arcuate valve seat in the body casting having a first radius about a second axis parallel to the first axis and displaced a given distance therefrom, forming a generally cylindrical metallic plug casting having a flow path extending therethrough, forming a second stop surface on a central plane of the plug casting, machining the plug casting to form an arcuate surface thereon having a second radius substantially equal to the first radius, and inserting the plug casting into the interior of the body casting through the entrance thereof so that when the plug casting is rotated to register the flow path therein with the flow path in the body casting, the cast first and second stop surfaces on the plug and body castings mutally enage one another.

References Cited by the Examiner

UNITED STATES PATENTS

| | | | |
|---|---|---|---|
| 2,499,732 | 3/1950 | Duhl | 251—163 |
| 2,574,428 | 11/1951 | Wheatley | 251—163 X |
| 2,765,142 | 10/1956 | Ludeman | 251—162 |
| 2,803,426 | 8/1957 | Zurik | 251—309 |
| 2,847,180 | 8/1958 | Ludeman | 251—163 |
| 3,052,013 | 9/1962 | Kane | 29—157.1 |
| 3,064,940 | 11/1962 | Anderson | 251—249.5 |
| 3,079,675 | 3/1963 | Bradbury | 29—157.1 |

ISADOR WEIL, *Primary Examiner.*

CLARENCE R. GORDON, *Examiner.*